United States Patent
Dignitti et al.

(10) Patent No.: US 9,113,721 B2
(45) Date of Patent: Aug. 25, 2015

(54) RESTRAINT SYSTEM FOR CHILD SUPPORT

(75) Inventors: Daniel M. Dignitti, Hamburg, NY (US); John S. Canna, Orchard Park, NY (US)

(73) Assignee: Mattel, Inc., El Segundo, CA (US)

( * ) Notice: Subject to any disclaimer, the term of this patent is extended or adjusted under 35 U.S.C. 154(b) by 388 days.

(21) Appl. No.: 13/495,475

(22) Filed: Jun. 13, 2012

(65) Prior Publication Data

US 2013/0162001 A1 Jun. 27, 2013

Related U.S. Application Data (60) Provisional application No. 61/498,735, filed on Jun. 20, 2011.

(51) Int. Cl.
  *A47D 15/00* (2006.01)
  *B60N 2/28* (2006.01)
  *F16B 2/22* (2006.01)

(52) U.S. Cl.
  CPC ............ *A47D 15/005* (2013.01); *A47D 15/006* (2013.01); *B60N 2/2812* (2013.01); *F16B 2/22* (2013.01); *Y10T 24/4465* (2015.01)

(58) Field of Classification Search
  CPC ... A47D 15/005; A47D 15/006; B60N 2/2812
  USPC ................. 297/467, 471, 485, 484, 464, 486; 24/633, 458, 531
  See application file for complete search history.

(56) References Cited

U.S. PATENT DOCUMENTS

| | | | | |
|---|---|---|---|---|
| 2,188,026 A | * | 1/1940 | Wiley | 24/293 |
| 2,833,343 A | * | 5/1958 | Benson | 297/473 |
| 3,323,186 A | * | 6/1967 | Rennert | 410/116 |
| 3,350,764 A | | 11/1967 | Geldwerth | |
| 3,765,063 A | * | 10/1973 | Farley | 410/116 |
| 3,954,280 A | * | 5/1976 | Roberts et al. | 280/801.2 |
| 3,967,351 A | | 7/1976 | Rosenberg et al. | |
| 4,055,860 A | | 11/1977 | King | |
| 4,150,464 A | | 4/1979 | Tracy | |
| 4,186,961 A | * | 2/1980 | Farrell et al. | 297/256.1 |
| 4,302,049 A | * | 11/1981 | Simpson | 297/484 |
| 4,408,375 A | | 10/1983 | Skobel | |
| 4,495,380 A | * | 1/1985 | Ryan et al. | 174/138 D |
| 4,580,842 A | * | 4/1986 | Segal | 297/488 |
| 4,685,741 A | * | 8/1987 | Tsuge et al. | 297/467 |
| 4,800,629 A | * | 1/1989 | Ikeda | 24/170 |
| 4,912,818 A | * | 4/1990 | Meeker | 24/170 |
| 4,982,981 A | * | 1/1991 | Fourrey et al. | 280/801.2 |
| 5,039,169 A | * | 8/1991 | Bougher et al. | 297/484 |
| 5,082,325 A | * | 1/1992 | Sedlack | 297/468 |

(Continued)

*Primary Examiner* — Peter Brown
(74) *Attorney, Agent, or Firm* — Edell, Shapiro & Finnan, LLC (57) ABSTRACT

The present invention is directed toward a restraint system for an infant support such as a highchair. The restraint system includes a restraining member adapted to pass through an aperture formed into the infant support. The restraining member includes a stop member selectively operable to pass through the aperture. Specifically, the stop member is configured to pass through the aperture when in a first orientation relative to the slot, but cannot pass through aperture when positioned in a second (e.g., opposite) orientation relative to the slot. With this configuration, the unintended separation of the restraint system from the infant support may be prevented. Additionally, with this configuration, the accidental tightening of the shoulder straps on a restrained child by a sibling pulling on the straps from behind the seat is also prevented.

16 Claims, 11 Drawing Sheets

(56) References Cited

U.S. PATENT DOCUMENTS

| | | | |
|---|---|---|---|
| 5,173,997 A * | 12/1992 | Takezawa et al. | 24/114.5 |
| 5,219,423 A * | 6/1993 | Kamaya | 224/583 |
| 5,294,183 A * | 3/1994 | Wetter et al. | 297/472 |
| 5,372,405 A * | 12/1994 | Cash et al. | 297/383 |
| 5,416,954 A | 5/1995 | Sobin | |
| 5,582,462 A | 12/1996 | Shea | |
| 5,695,243 A * | 12/1997 | Anthony et al. | 297/250.1 |
| 5,964,017 A * | 10/1999 | Roberts | 29/91.1 |
| 5,964,502 A * | 10/1999 | Stephens | 297/250.1 |
| 6,155,638 A * | 12/2000 | Bapst | 297/250.1 |
| 6,382,635 B1 * | 5/2002 | Fitzgerald | 277/630 |
| 6,543,847 B2 * | 4/2003 | Balensiefer | 297/250.1 |
| 6,547,334 B1 | 4/2003 | Girardin | |
| 6,568,761 B2 * | 5/2003 | Perske et al. | 297/452.6 |
| 6,604,265 B2 | 8/2003 | Giampavolo | |
| 6,846,020 B2 * | 1/2005 | Xu | 280/808 |
| 7,178,872 B2 * | 2/2007 | Balensiefer et al. | 297/250.1 |
| 7,188,897 B2 | 3/2007 | Patrizi et al. | |
| 7,252,342 B2 | 8/2007 | Patrizi et al. | |
| 7,513,020 B2 | 4/2009 | Giampavolo | |
| 7,547,065 B2 * | 6/2009 | Barger | 297/250.1 |
| 7,552,969 B2 * | 6/2009 | Maciejczyk | 297/250.1 |
| 7,559,126 B2 | 7/2009 | Giampavolo | |
| 7,578,561 B2 * | 8/2009 | Canna et al. | 297/485 |
| 7,681,288 B1 | 3/2010 | Giampavolo | |
| 7,685,685 B2 | 3/2010 | Giampavolo | |
| 7,725,993 B1 | 6/2010 | Giampavolo | |
| 7,735,919 B2 * | 6/2010 | Chen et al. | 297/250.1 |
| 7,744,163 B2 | 6/2010 | Opsvik | |
| 7,819,485 B2 * | 10/2010 | Hartenstine et al. | 297/484 |
| 7,891,741 B2 * | 2/2011 | Lienr, Jr. | 297/485 |
| 7,980,634 B2 * | 7/2011 | Jay | 297/473 |
| 8,001,634 B2 * | 8/2011 | Ayette et al. | 5/621 |
| 8,177,303 B2 * | 5/2012 | Chen et al. | 297/484 |
| 8,360,521 B2 * | 1/2013 | Macliver | 297/250.1 |
| 8,434,827 B2 * | 5/2013 | Young et al. | 297/467 |
| 8,550,316 B2 * | 10/2013 | Coote | 224/160 |
| 2003/0085608 A1 * | 5/2003 | Girardin | 297/484 |
| 2003/0121130 A1 * | 7/2003 | Buscart et al. | 24/615 |
| 2004/0250387 A1 * | 12/2004 | Jones et al. | 24/633 |
| 2005/0110316 A1 | 5/2005 | Perrotti | |
| 2006/0108845 A1 * | 5/2006 | Balensiefer et al. | 297/250.1 |
| 2006/0214495 A1 * | 9/2006 | Glover et al. | 297/484 |
| 2008/0111410 A1 * | 5/2008 | Jane Santamaria | 297/253 |
| 2008/0164735 A1 * | 7/2008 | Hartenstine et al. | 297/250.1 |
| 2008/0211278 A1 * | 9/2008 | Macliver | 297/250.1 |
| 2008/0238179 A1 | 10/2008 | Patrizi et al. | |
| 2008/0258527 A1 * | 10/2008 | Gower et al. | 297/256.15 |
| 2008/0296944 A1 * | 12/2008 | Nakagawa et al. | 297/250.1 |
| 2010/0201170 A1 * | 8/2010 | Brandl et al. | 297/250.1 |
| 2012/0126607 A1 * | 5/2012 | Chen et al. | 297/486 |
| 2012/0131770 A1 * | 5/2012 | Iwahara et al. | 24/458 |
| 2012/0326476 A1 * | 12/2012 | Runk et al. | 297/250.1 |
| 2013/0119718 A1 * | 5/2013 | Kane et al. | 297/183.1 |

\* cited by examiner

RESTRAINT SYSTEM FOR CHILD SUPPORT

CROSS-REFERENCE TO RELATED APPLICATION

This application claims priority to and the benefit of U.S. Provisional Patent Application No. 61/498,735, filed Jun. 20, 2011, entitled "Restraint System for Child Support" the entire disclosure of which is incorporated herein by reference in its entirety.

FIELD OF THE INVENTION

The present invention relates to a restraint system for a child support including a clip that selectively couples a restraint to a child support.

BACKGROUND

Child support structures, such as highchairs, support young children during feeding and other seated activities. A highchair positions a child comfortably at a higher elevation compared to that of a conventional adult seat. This higher positioning gives parents easier access to the child during activities such as feeding. However, the increased height also increases the chance of injury should a child fall from the highchair. To maintain the safety of the child, some highchairs include a restraint assembly or system. The restraint system may include a series of straps connected via buckles. A problem occurs when the straps decouple from the child support structure. Thus, it would be desirable to provide a restraint system for an infant support that prevents accidental decoupling of a restraining member from the child support structure. Additionally, it is desirable to prevent the sudden and unexpected tightening of the straps on a child restrained in the child support structure (such as that caused by a sibling pulling on the restraints from the back of the chair).

SUMMARY

The present invention is directed toward a restraint system for an infant support. The restraint system includes a restraining member adapted to pass through an aperture formed into the infant support. The restraining member includes a stop member operable to selectively pass through the aperture. Specifically, the stop member is configured such that it passes through the aperture when oriented in a first position relative to the aperture (or when moved in a first direction through the aperture), but cannot pass through aperture when oriented in a second position relative to the aperture (or moved through the aperture in a second direction). With this configuration, the unintended separation of the restraint system from the infant support may be prevented.

BRIEF DESCRIPTION OF THE SEVERAL VIEWS OF THE DRAWINGS

Like reference numerals have been used to identify like elements throughout this disclosure.

DETAILED DESCRIPTION

The terms and phrases "support," "support device," "seating configuration," "support assembly," and "support structure" are used herein to refer to any frame or support that is configured to provide a support for an object. The phrases "infant support," "infant support device," and "infant support structure" are used herein to refer to any frame or support that can be used to support an infant or child in a stationary manner or in a moving manner. Similarly, the phrases "child support," "child support device," and "child support structure" are used herein to refer to any frame or support that can be used to support an infant or child in a stationary manner or in a moving manner. Some exemplary infant/child support structures are swings, bassinets, jumping devices, bouncers, high chairs, rockers, hammocks, infant seats, infant carriers, etc. The terms "child" and "infant" may be used interchangeably herein.

Figure 1:
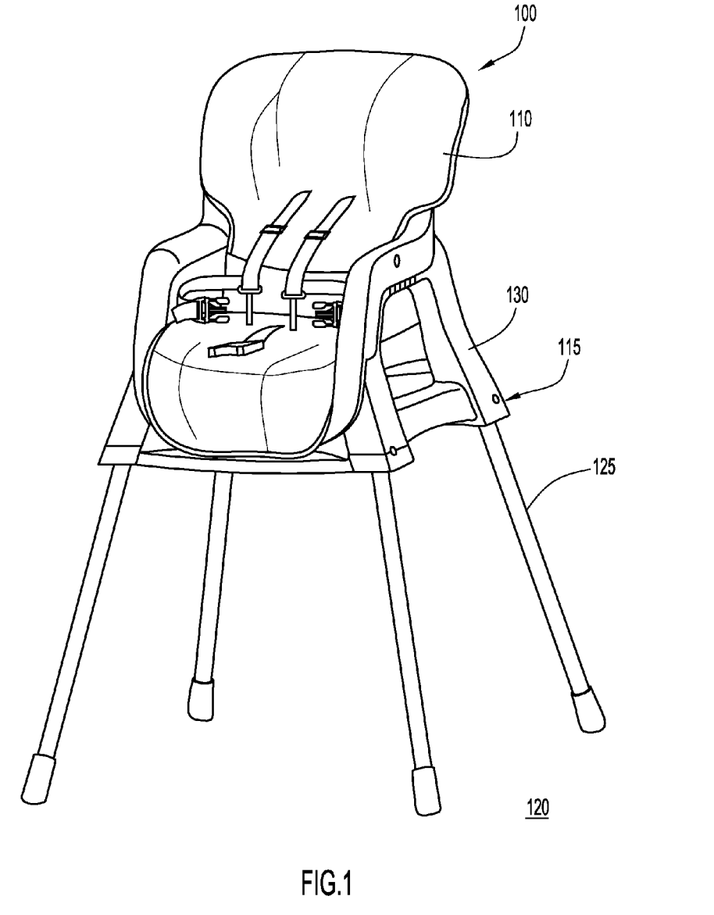
FIG. 1 illustrates a front perspective view of a child support with a restraint system in accordance with an embodiment of the present invention.

FIG. 1 illustrates a child support 100 including a restraint system in accordance with an embodiment of the present invention. The child support 100 includes a seat 110, a support assembly 115 and legs 125, configured such that support assembly 115 and legs 125 support seat 110. In the illustrated embodiment, the support assembly 115 includes a support frame 130 and a plurality of support members or legs 125 extending downward from support frame 130. Further details of the seat 110 and the support assembly 115 structure (which are exemplary structures) are provided in U.S. application Ser. No. 13/038,742, incorporated herein by reference in its entirety.

Figure 2A:
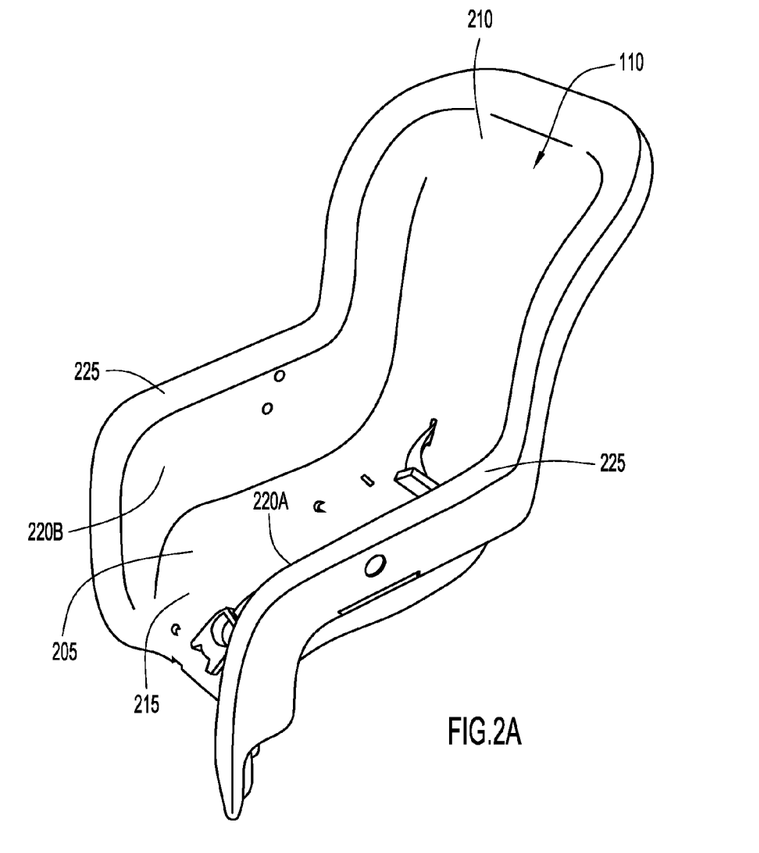
FIG. 2A illustrates an isolated, perspective view of the seat of the child support of FIG. 1.

The seat 110 may possess any shape and any suitable dimensions. Referring to FIG. 2A, the seat 110 includes a seat portion 205 and a seatback portion 210 extending distally (upward) from the seat portion proximate the rearward edge of the seat portion. The seatback portion 210 may be oriented at an angle with respect to the seat portion, e.g., such that the seatback portion inclines or declines with respect to the seat portion 205, or may be oriented such that the back is oriented substantially orthogonal to the seat portion. The seat 110 may further include a leg rest portion 215 extending distally (downward) from the seat portion 205 proximate seat portion forward edge. The leg rest portion 215 may be oriented substantially orthogonal to the seat portion 205.

In the embodiment illustrated, the seat 110 further includes a first side wall 220A and a second side wall 220B extending upward from the left and right lateral sides of the seat portion 205, respectively. The side walls 220A, 220B define an arm rest 225 along their distal (upper) end. With this configuration, the seat portion 205, the seatback portion 210, the leg rest portion 215, and the side walls 220A, 220B cooperate to define a seating area, receptacle, or bucket for a child, such as an infant or a toddler. In operation, when a child is positioned within the seat 110 (i.e., seated), the torso (back) of the child is supported by the seatback portion 210 and the legs of the child are supported by the leg rest portion 215.

The seat 110 may be formed of any material suitable for its intended purpose. By way of example, the seat may be a unitary structure formed of molded plastic.

Figure 2B:
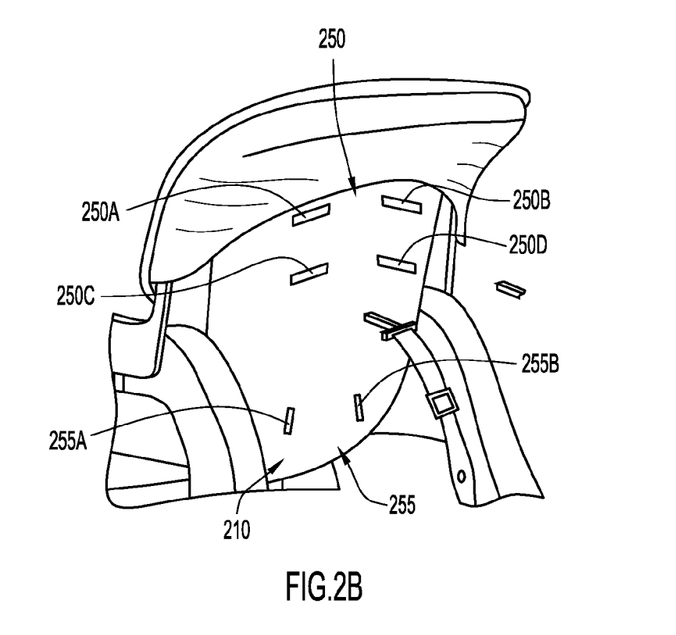
FIGS. 2B and 2C illustrate partial rear views of the child support shown in FIG. 1, showing the seatback slots.
Figure 2C:
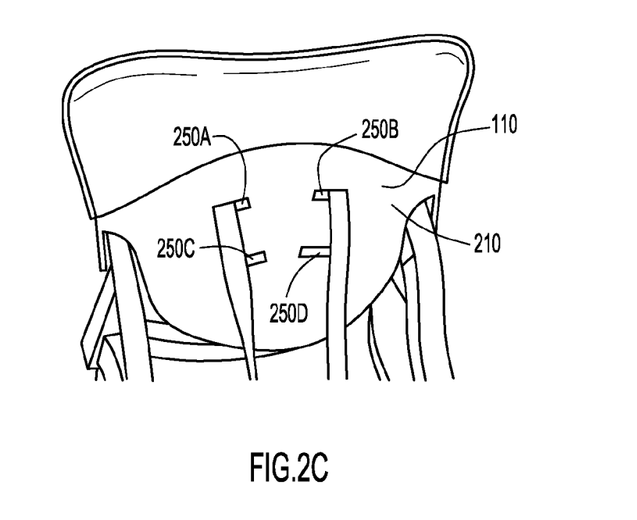

The seat 110 is adapted to receive a restraint system operable to secure a child within the seating area. In an embodiment, the seat 110 includes one or more apertures or slots formed into the seatback portion 210. Each slot may extend from the forward seatback surface (i.e., the surface of the seatback facing the child) to the rear seatback surface, defining a passage permitting a restraining member to pass through the seatback portion 210. Referring to the embodiment shown in FIGS. 2A-2C, the seatback portion 210 includes a plurality of shoulder restraint slots 250 disposed at predetermined locations proximate the upper section of the seatback portion (see FIGS. 2B and 2C). Specifically, the seatback portion 210 includes a first shoulder restraint slot 250A laterally spaced from a second shoulder restraint slot 250B, as well as a third shoulder restraint slot 250C laterally spaced from a fourth shoulder restraint slot 250D. The first 250A and second 250B shoulder restraint slots are each oriented directly above the third 250C and fourth 250D shoulder restraint slots, respectively. As shown, each shoulder restraint slot 250 may be in the form of a generally elongated opening oriented substantially horizontal or a slight angle with respect to the supporting surface 120.

The seatback portion 210 may further include one or more waist restraint slots 255 disposed along the lower section of the seatback portion 210 (i.e., disposed proximate the seat portion 205). As seen best in FIG. 2B, the seatback portion 210 includes a first waist restraint slot 255A laterally spaced from a second waist restraint slot 255B. Each waist restraint slot 255A, 255B may be a generally elongated opening oriented substantially vertically with respect to the supporting surface 120 (i.e., substantially orthogonal to the seat portion 205).

The seat portion 205 may further include restraint slots operable to receive other various restraints. For example, in addition or as an alternative to the waist restraint slots 255 formed in the seatback portion 210, the seat portion 205 may include one or more waist restraint slots. In addition, the seat portion 205 may include a crotch restraint slot (not illustrated).

The restraint system 105, which secures the infant within the seat/receptacle, includes at leas one restraining member configured to extend through a restraint slot formed within the child support 100. In an embodiment, the restraint system 105 includes a series of restraining members that cooperate to secure a child within the seat 100. Referring to the embodiment illustrated in FIG. 3A, the restraint system 105 includes a first or right shoulder restraining member 305A, a second or left shoulder restraining member 305B, a first waist restraining member 310A, a second waist restraining member 310B, and a crotch restraining member 315. The shoulder restraining members 305A, 305B are configured to extend over the shoulders of a child positioned within the seat 110, while the waist restraining members 310A, 310B are configured to wrap around the sides of the child (proximate the waist). Finally, the crotch restraining member 315 is configured to extend between the legs of the child, extending upward from seat portion 205.

Figure 3A:
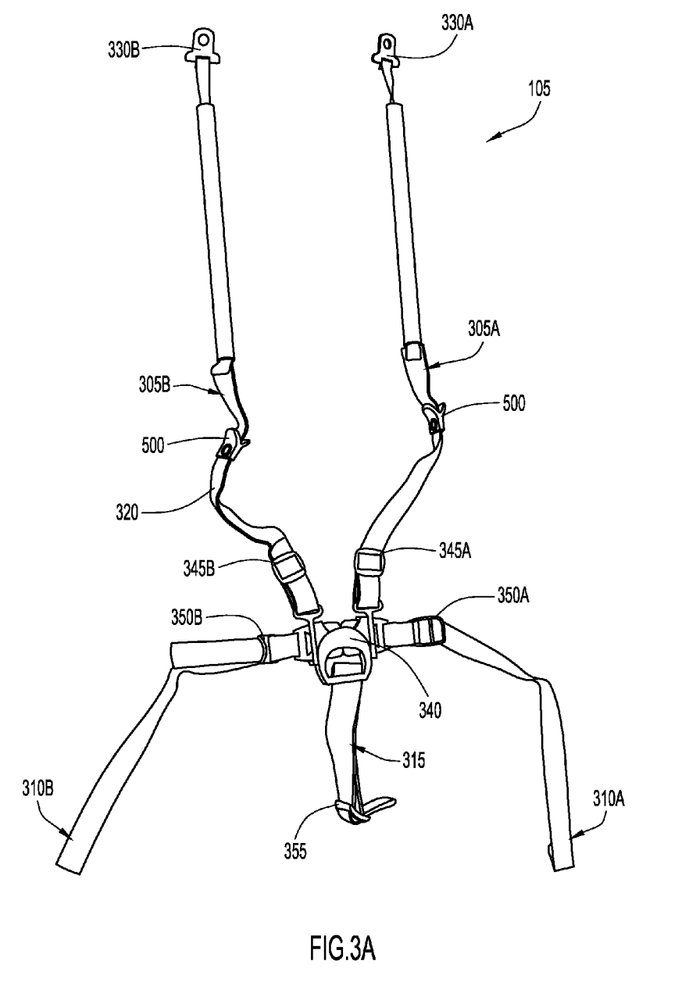
FIG. 3A illustrates a plan view of the restraint system in accordance with an embodiment of the present invention.

Restraining members 305A, 305B, 310A, 310B,and 315 each include a strap 320 (e.g., an elongated flap or ribbon) formed of natural or synthetic materials. By way of example, the strap 320 may be formed of leather, or may be a textile (formed of cloth/fabric), or may be any woven or nonwoven web formed of cotton (e.g., canvas), polyester, etc. Each strap 320 may be formed of any material and possess any dimensions suitable for its described purpose. Each strap 320 may possess uniform dimensions throughout its length, or may possess segments possessing differing dimensions. It should be understood, while elongated ribbons are illustrated, the straps 320 may possess other shapes (e.g., the strap may possess an oval cross section, a circular cross section, etc.).

Figure 3B:
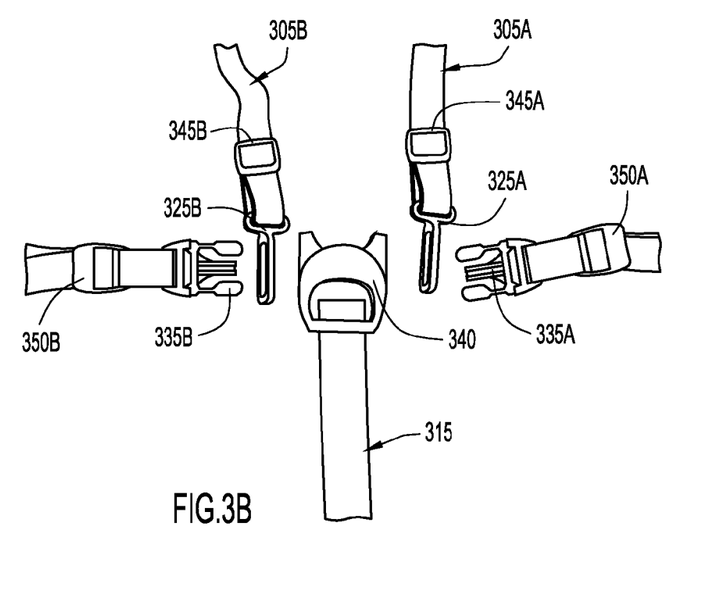
FIG. 3B illustrates a close-up view of the restraint system of FIG. 3A, showing the connection of various restraining members to a central connector.

Referring to FIG. 3B, the restraining members 305A, 305B, 310A, 310B, 315 further include one or more connectors disposed at predetermined locations along their corresponding strap 320. In the illustrated embodiment, the straps 320 forming the shoulder restraining members 305A, 305B each includes a pass-through or loop connector 325A, 325B coupled to first strap end, and an eye fastener or clip 330A, 330B (seen in FIGS. 3A and 4) coupled to second strap end. Similarly, the strap 320 forming the waist restraining member 310A, 310B includes a buckle, such as male connector or clip 335A, 335B coupled to strap end. Each of the restraining members may couple to a fastener receiving portion, such as restraint connector 340, which, in turn, is secured to crotch restraining member 315. In operation, each pass-through connector 325A, 325B receives a buckle 335A, 335B, which, in turn, releasably couples to the restraint connector 340.

Figure 4:
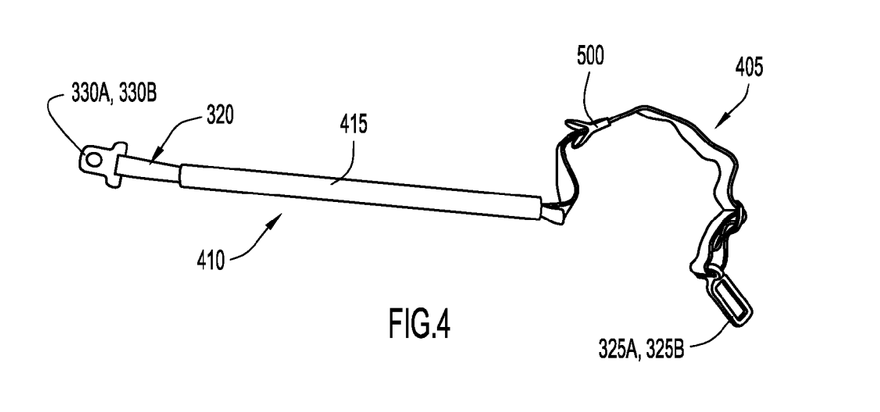
FIG. 4 illustrates an isolated view of a shoulder restraining member in accordance with an embodiment of the present invention.
Figure 8A:
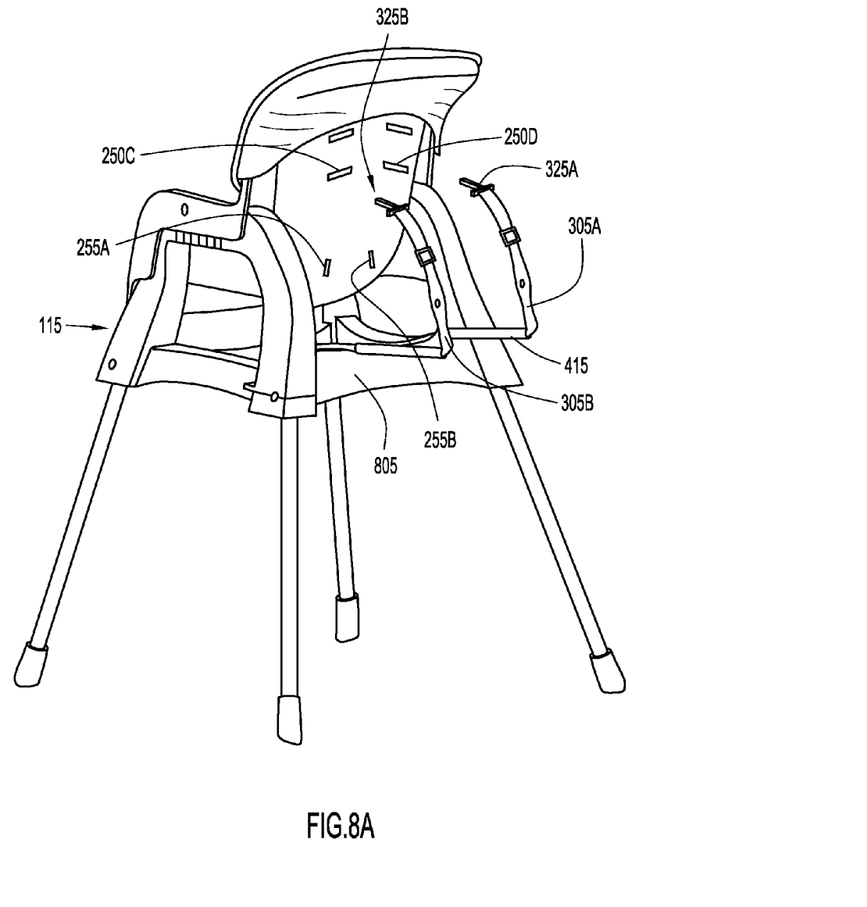
FIGS. 8A-8C illustrate the operation of the child support and the restraint system.

Referring to FIG. 4, each of the eye fasteners 330A, 330B disposed on the shoulder restraining members 305A, 305B has an opening formed therein that is sized to either receive a leg 125 therethrough, or to couple to a boss formed on the cross bar of the child support device (FIG. 8A). Coupling the eye fasteners 330A, 330B to a boss or the support assembly legs 125 prevents the shoulder restraining members 305A, 305B from hanging loosely or becoming detached from the child support 100.

Each restraining member 305A, 305B, 310A, 310B, 315 may further include an adjustment buckle through which the length the strap 320 forming the restraining member can be adjusted. Specifically, the straps 320 forming shoulder restraining members 305A, 305B may be adjusted via shoulder adjustment mechanisms 345A and 345B, respectively. Similarly, the straps 320 forming waist restraining members 310A, 310B may be adjusted via waist adjustment mechanisms 350A and 350B, respectively. Finally, the strap 320 forming crotch restraining member 315 may be adjusted via crotch adjustment mechanism 355.

FIG. 4 shows a shoulder restraining member 305A, 305B in accordance with an embodiment of the invention. As shown, each strap 320 forming the shoulder restraining member 305A, 305B includes a first or proximal strap portion 405 (including the pass-through connector 325A, 325B) and a second distal strap portion 410 (including the clip 330A, 330B). The distal strap portion 410 may possess dimensions that are the same as or that differ from the dimensions of the proximal strap portion 405. By way of example, the proximal strap portion 405 may be wider in the transverse dimension than that of the distal strap portion 410.

The shoulder restraining member 305A, 305B may further include a rigid or flexible sheath 415 disposed along the distal strap portion 410. By way of example, the sheath 415 may be a rigid, hollow, generally cylindrical tube defining a central internal passage through which the strap 320 forming the distal portion 410 of shoulder restraining member 305A, 305B passes.

The shoulder restraining member 305A, 305B further includes a stop member or mechanism 500 operable to prevent the passage of the shoulder restraining member through the shoulder restraint slot 250A-250D of the seat 110. As seen best in FIG. 4, the stop member 500 may disposed at an intermediate longitudinal position along the strap 320. By way of example, the stop member 500 is configured such that passage of the stop member 500 is permitted through the shoulder restraint slot 250A-250D when disposed in a first orientation, but passage through the shoulder restraint slot 250A-250D is prevented when the stop member 500 is disposed in a second orientation.

Figure 5A:
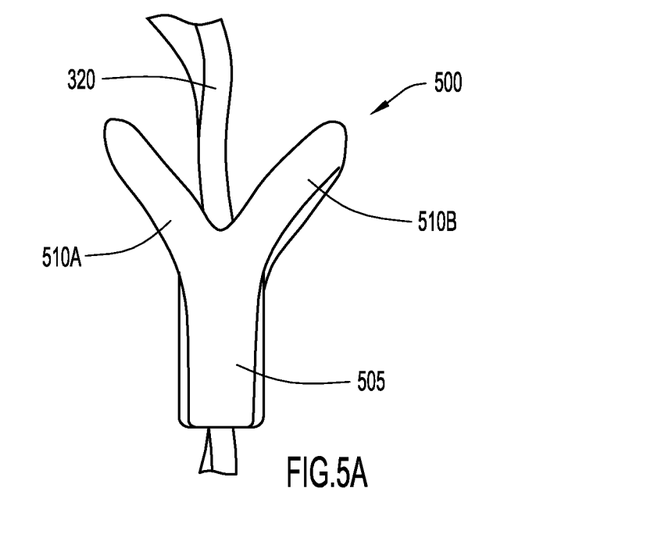
FIGS. 5A and 5B illustrated side and perspective views, respectively, of a stop member in accordance with an embodiment of the invention.
Figure 5B:
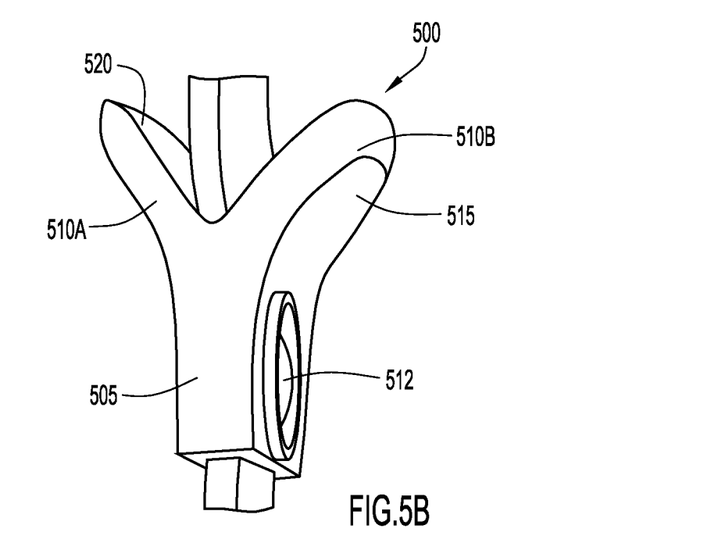

FIGS. 5A and 5B illustrate a stop member 500 (also called a slot capture member) in accordance with an embodiment of the invention. As shown, the stop member 500 is a generally Y-shaped clip defined by a base 505 (the long leg of the Y) and a pair of opposed prongs or fingers 510A, 510B (the short legs of the Y). Each prong 510A, 510B possesses a generally smooth, slightly curved exterior surface 515 and an interior surface 520 that cooperates with the opposing prong to define the mouth of the clip. The prongs 510A, 510B extend angularly outward from the central, vertical axis of the base 505. The prongs 510A, 510B are resilient, being disposed for movement from a normal or expanded position, to a collapsed or compressed position. In the compressed position, the prongs 510A, 510B are pivoted toward each other (e.g., pivoted inward until the interior surfaces 520 of the first and second prongs contact). The stop member 500 includes an internal passage through which the strap 320 passes. The stop member 500 may be fixed to a strap 320 (via a fastener 512) such that the orientation of the stop member 500 is maintained relative to the strap 320.

With this configuration, the stop member 500 may pass through a shoulder restraint slot 250 when positioned in a first orientation with respect to the slot, but may be prevented from passing through a shoulder restraint slot 250 when positioned in a second orientation with respect to the slot. Generally referring to FIGS. 6A-C and 7A-B, exemplary embodiments of the first and second orientations may be shown. Although stop members 500 may generally be coupled to, attached to or included with straps 320, FIGS. 6A-C and 7A-B have omitted straps 320 for clarity.

Figure 6A:
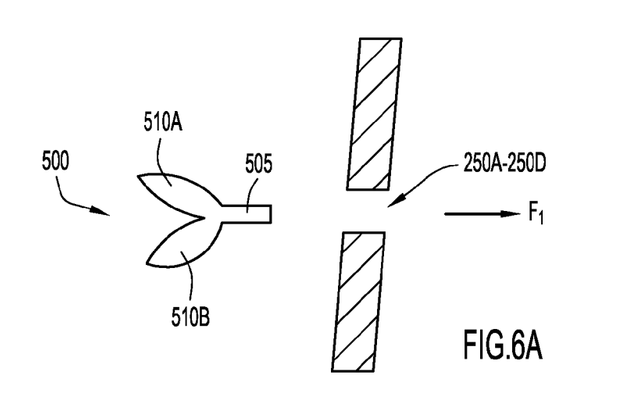
FIGS. 6A-6C are drawings which illustrate the operation of the stop member in a first position or orientation (where the strap of the restraining member has been removed for clarity).
Figure 6B:
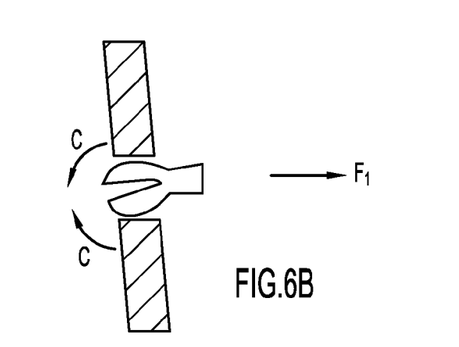
Figure 6C:
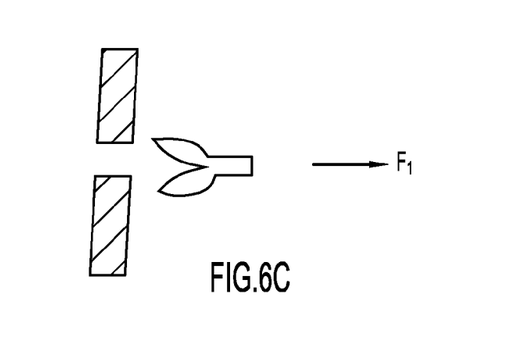

In a first orientation, as illustrated by FIGS. 6A-C, stop member 500 may be configured to pass through a restraint slot 250. As seen in FIG. 6A, in a first orientation, the base 505 of stop member 500 is disposed proximate to shoulder restraint slots 250A-D, such that base 505 may enter a restraint slot 250A-D before prongs 510A-B. As a stop member 500 oriented in a first configuration is drawn, pushed or otherwise moved towards restraint slot 250, in accordance with directional arrow F1, prongs 510A and 510B are oriented in their normal, expanded position. However, once stop member 500 engages or enters a restraint slot 250, as seen in FIG. 6B, the walls (the upper and lower walls) or sides of the shoulder restraint slot 250A-250D may engage prongs 510A and 510B, causing prongs 510A and 510B to flex inward from their normal position to their compressed position (indicated by arrows C). When prongs 510A, 510B are in their compressed position, the stop member 500 may travel along or through shoulder restraint slot 250A-250D in accordance with directional arrow F1. Once stop member 500 clears the shoulder restraint slot 250A-250D, as seen in FIG. 6C, the resiliency of the prongs 510A, 510B causes them return to their normal, expanded position.

Figure 7A:
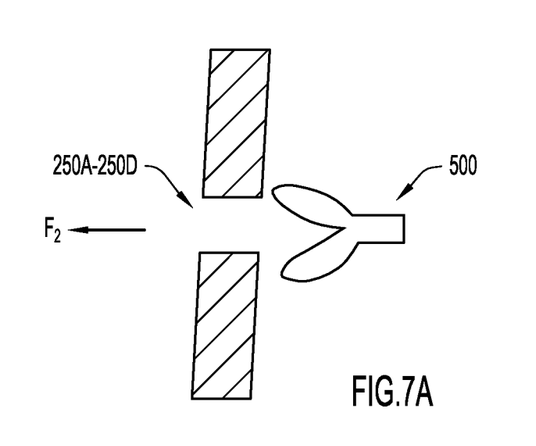
FIGS. 7A-7B are drawings which illustrate the operation of the stop member in a second position or orientation (where the strap of the restraining member has been removed for clarity).
Figure 7B:
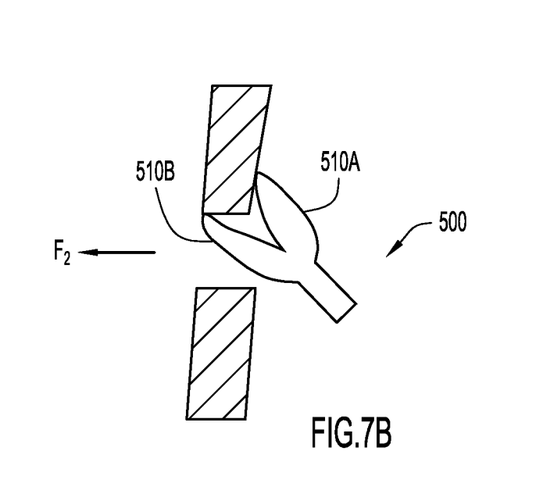

Referring to FIGS. 7A-B, once stop member 500 has been inserted through restraint slot 250A-250D (as seen in FIGS. 6A-C), stop member 500 may be in a second orientation. In the second orientation, the stop member 500 is positioned with prongs 510A, 510B disposed proximate to a shoulder restraint slot 250A-D, such that prongs 510A-B may engage restraint slot 250A-D before base 505 when stop member 500 is moved towards restraint slot 250A-D, such as in direction F2. In this second configuration, prongs 510A and 510B are oriented in their normal, expanded position, which may be wider than the restraint slot 250A-D. Thus, stop member 500 may be prevented from entering or passing through restraint slot 250A-D when in the second configuration.

Figure 7C:
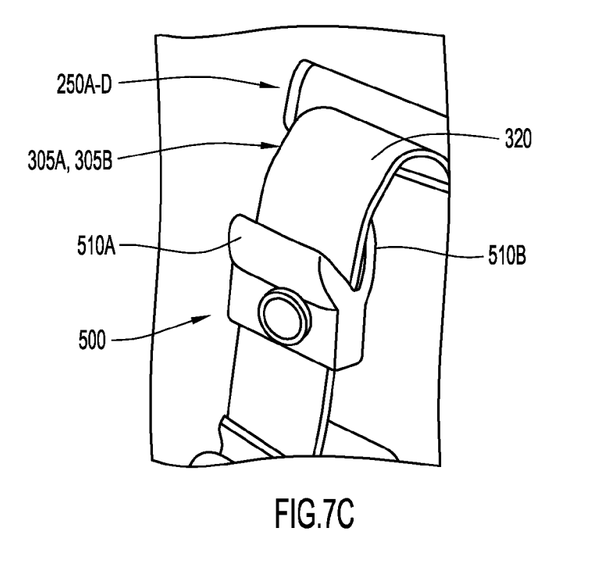
FIGS. 7C-7D illustrate the operation of the stop member in the second position or orientation.
Figure 7D:
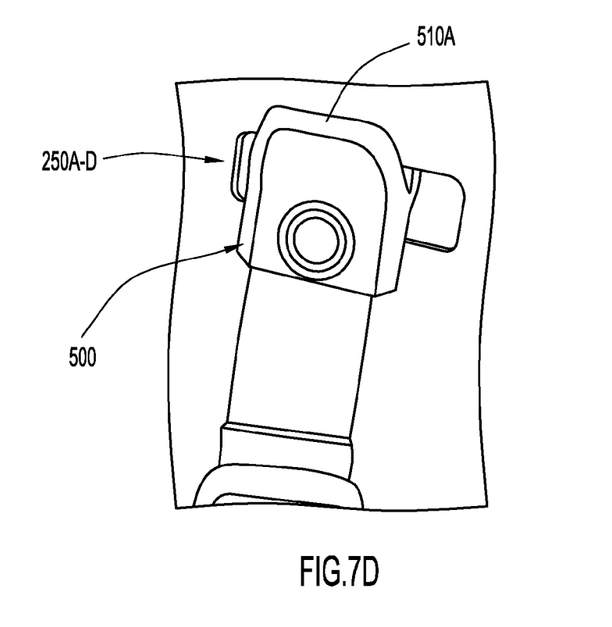

More specifically, if a stop member 500 in a second orientation is drawn toward the slot 250A-250D (indicated by arrow F2 in FIGS. 7A-B and represented by the different locations of stop member 500 between FIGS. 7C and 7D), such as by a sibling pulling on the shoulder straps from the rear of the seat, the prongs 510A, 510B interfere with the passage of the stop member 500 through the slot 250A-250D. In some embodiments, as shown in FIGS. 7B and 7D, the stop member 500 becomes trapped or lodged against the external walls of restraint slot 250A-D (i.e. stop member 500 may be pinned against seat 210). Consequently, the stop member 500 cannot pass back through the slot 250A-250D unless the prongs 510A, 510B are manually compressed (e.g., by a parent).

Once compressed (or inverted to the first orientation), stop member 500 may be inserted through the shoulder restraint slot 250A-250D and the restraining member 305A, 305B can be decoupled from the seat 110. This configuration prevents accidental separation of the shoulder restraining members 305A and 305B from the seat 110 while permitting intentional (manual) separation of the restraining members 305A and 305B from the seat 110. Further, restraining members 305A and 305B may be fully decoupled, separated, or otherwise removed from seat 110, such as for cleaning, because pass-through connectors 325A and 325B may be sized to pass through each shoulder restraining slot 250A-250D. Additionally, with this configuration, the accidental tightening of the shoulder straps on a restrained child by a sibling pulling on the straps from behind the seat is also prevented.

Stated another way, since the position of the stop member 500 is fixed with respect to the strap 320, movement of the restraining member 305A, 305B (i.e., the strap) through the slot 250A-250D in a first direction (in which the base 505 is the first part of stop member 500 to enter slot 250A-250D) permits passage of the stop member therethrough. However, movement of the restraining member 305A, 305B, in a second, opposite direction, such that the prongs 510A and 510B are the first part of stop member 500 to enter slot 250A-250D, causes the interference described above, preventing passage of the stop member 500 through the slot.

While stop members 500 are only shown on the shoulder restraining members 305A, 305B, it should be understood that a stop member may further be disposed on any of the waist or 310A, 310B crotch 315 restraining members.

Figure 8B:
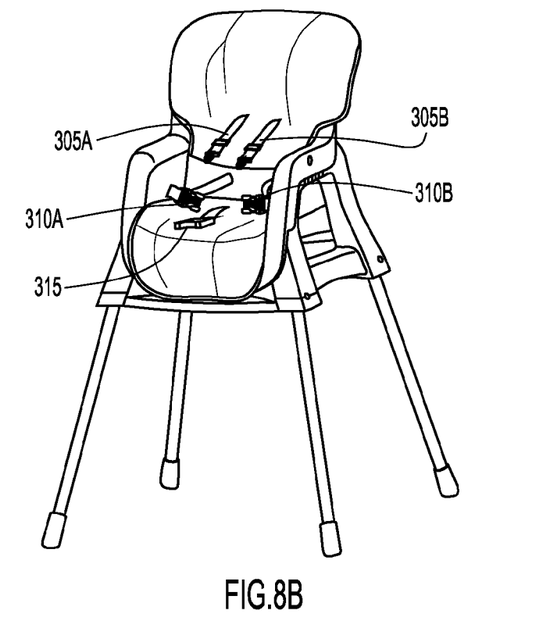
Figure 8C:
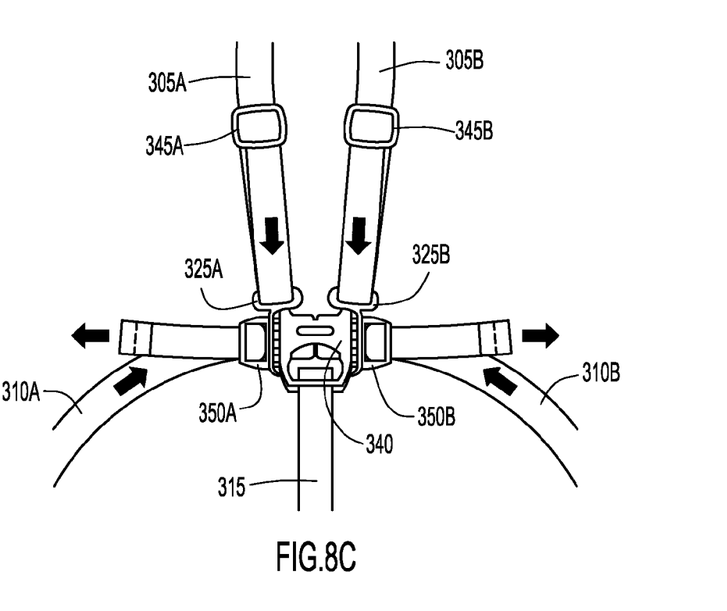

The operation of the restraint system is explained with reference to FIGS. 8A-8C. The first clip 330A (seen in FIG. 4) is disposed on the first shoulder restraining member 305A and is secured to a boss located on crossbar 805 of the child support 100. Similarly, the second clip 330B (seen in FIG. 4) is disposed on the second shoulder restraining member 305B and is secured to a boss located on the crossbar 805 of the child support 100. The proximal portion 405 (seen in FIG. 4)

of the first shoulder restraining member 305A is axially inserted into the third shoulder restraint slot 250C, with pass-through connector 325A being inserted first, and the strap 320 being drawn through until the stop member 500, which is secured to the strap 320 such that the base 505 enters the slot first, travels through the third slot 250C due to compression of the prongs 510A, 510B (as described above) until the stop member is positioned in the second orientation on the child-receiving side of the seat 110. Similarly, the second shoulder restraining member 305B is axially inserted into the fourth shoulder restraint slot 250D such that the pass-through connector 325B is inserted first. The strap 320 of restraining member 305B is drawn through the fourth slot 250D until the stop member 500 coupled thereto is positioned in the second orientation, similarly to the stop member 500 of restraining member 305A.

The remaining straps, 315, 310A, and 310B, may be used in conjunction with or independently from shoulder straps 305A and 305B. However, the remaining straps are similarly drawn through corresponding slots when used to secure a child. More specifically, restraining members 310A, 310B are drawn through corresponding waist slots 255A, 255B while crotch restrain member may be drawn through seat 110 through a corresponding hole in seat portion 205. Each of straps 310A, 310B, and 315 may be secured to seat 110 in any desirable manner, such as securing each strap within its corresponding slot. Further, each strap 310A, 310B, and 315 may include a stop member 500 if so desirable.

Once secured to seat 110, the restraining members 305A, 305B, 310A, 310B, 315 are then wrapped around a child seated on the seat 110. Specifically, the crotch restraint member 315 (including restraint connector 340) is drawn between the legs of the child. The shoulder restraining members 305A, 305B are drawn over the shoulders of the child, and disposed proximate the restraint connector 340. The waist restraining members 310A, 310B, in turn, are wrapped around the waist of the child, fed through corresponding pass-through connectors 325A, 325B, and buckles 335A and 335B are connected to restraint connector 340. Once connected, a child occupying the seat is secured to the seat 110, preventing the child from accidentally falling out therefrom. To release the restraints, a parent may actuate a release between the restraint connector 340, buckle 335A and buckle 335B. The release may be any desirable release suitable for achieving the described purpose and may release both or one buckle at the users discretion. Once released, waist restraining members 310A, 310B may be removed from pass-through connectors 325A and 325B, such that shoulder restraining members 305A and 305B are free to be removed, thus reversing the above process.

While the present invention has been described in detail and with reference to specific embodiments thereof, it will be apparent to one skilled in the art that various changes and modifications can be made therein without departing from the spirit and scope thereof. For example, the material forming the restraint system or portions thereof may be any suitable material for its described purpose.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, terms such as "first," "second," "third," etc., merely identify one of a number of portions, components and/or points of reference as disclosed herein, and do not limit the present invention to any particular configuration or orientation.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

For example, while a five-point restraint system is illustrated, the stop members may be utilized with three point restraints. In other embodiments the stop members may be secured to other restraining members of the restraint system. Thus, in alternative embodiments, the quantity of points of the restraint system can vary. For example, a three point restraint system can be used in the infant seat mode, the swing mode, and the toddler seat mode. In addition, a five point restraint system can be used in the high chair mode.

What is claimed is:

1. A restraint system for a child support including a seat with a slot, the system comprising:
   a restraining member adapted to pass through the slot; and
   a stop member fixedly coupled at a first location on the restraining member, the stop member having a first end and a second end, the stop member comprising a base and a pair of opposed, resilient prongs extending from the base, the prongs being flexible from a normal, outward position, to a compressed, inward position,
   wherein, in a first position with respect to the slot, the stop member is permitted to pass through the slot from the first end to the second end of the stop member, and in a second position with respect to the slot, the second end of the stop member is not permitted to pass through the slot.

2. The restraint system of claim 1, wherein the resilient prongs, when configured in the normal position, are separated by a gap, the gap having a width which is wider than a height of the slot.

3. The restraint system of claim 1, wherein the restraint system is configured for a child seat having a child receiving side and an outer side, wherein the restraining member is coupled to the child support proximate the outer side and configured to secure a child in the child receiving side of the seat.

4. The restraint system of claim 3, wherein the restraining member is a first restraint member and the restraint system further includes at least a second restraint member configured to restrain a child in the child support.

5. The restraint system of claim 4, wherein each restraint member is configured to pass through a different slot in the seat and secure each of a child's shoulders.

6. The restraint system of claim 4 including a restraint connector, wherein the restraint connector may removably secure any number of restraint members together on the child receiving side of the seat, such that the restraint members are removably secured around a child positioned in the child receiving side of the seat.

7. The restraint system of claim 1, wherein the restraint system includes two shoulder restraining members, two waist restraining members and a crotch restraining member.

8. The restraint system of claim 7, wherein at least one of the restraining members does not include a stop member.

9. The restraint system for a child support of claim 1 wherein the stop member is coupled to an intermediate portion of the restraining member.

10. A child seat comprising:
a seat including a child receiving side and an outer side opposite said child receiving side, said seat including a seating portion and a back rest portion, said seat also including passages through said seat for receiving child restraint straps, said passages passing from said child receiving side to said outer side;
a restraint system including at least two child restraint straps including a first end, a second end and an intermediate portion, each of the child restraint straps being inserted through a respective one of said passages, and at least one of the child restraint straps comprising:
a stop mechanism coupled to the intermediate strap portion, the stop mechanism being configured to engage the same passage through which the at least one strap is inserted, the stop mechanism comprising a base and a pair of opposed, resilient prongs extending from the base, the prongs being flexible from a normal, outward position, to a compressed, inward position;
a restraint connector disposed on the first end of said at least one child restraint strap, the restraint connector being removably and securely receivable by a fastener receiving portion,
wherein the stop mechanism is configured such that the stop mechanism may move through one of the passages in a first orientation and be prevented from moving through the passages in a second orientation, wherein in the first orientation the base of the stop mechanism is disposed closest to one of the passages and in the second orientation the prongs of the stop mechanism are disposed adjacent to one of the passages and the base is spaced a distance away from the passage.

11. The child seat of claim 10, wherein the resilient prongs, when configured in a normal position, are separated by a gap, the gap having a width which is wider than a height of a at least one of the passages.

12. The child seat of claim 10, wherein the at least two restraint straps are received in different passages, such that each restraint strap may secure a different side of a child positioned in the seat.

13. The child seat of claim 10, wherein the restraint system includes two shoulder restraining members, two waist restraining members and a crotch restraining member.

14. The child seat of claim 10, wherein the stop mechanism may enter and pass through a passage from a first side of the seat to a second side of the seat, but not from the second side of the seat to the first side of the seat.

15. A stop mechanism for preventing longitudinal movement of a strap through a member via a slot, the stop mechanism comprising:
a base fixedly coupled to the strap at an intermediate longitudinal position, the base having an outer edge with an outer width;
at least two opposed, resilient fingers extending from the base, the fingers being flexible from a normal, outward position, to a compressed, adjacent, inward position,
wherein the at least two resilient fingers extend beyond the outer width of the base in the outward position and are compressed to an inward position such that the stop mechanism allows unlimited movement through the slot that the strap extends through in a first direction and limits movement through the slot in a second and opposite direction.

16. The stop mechanism of claim 15, wherein the strap extends through a central portion of the base and between the resilient fingers.

* * * * *